United States Patent
Wood, II et al.

[11] Patent Number: 5,923,471
[45] Date of Patent: Jul. 13, 1999

[54] OPTICAL INTERFERENCE COATING CAPABLE OF WITHSTANDING SEVERE TEMPERATURE ENVIRONMENTS

[75] Inventors: Byron A. Wood, II; William H. Howard, both of Santa Rosa, Calif.

[73] Assignee: Deposition Sciences, Inc., Santa Rosa, Calif.

[21] Appl. No.: 08/753,574

[22] Filed: Nov. 26, 1996

[51] Int. Cl.⁶ .............................. G02B 1/10; G02B 5/28; G02B 5/08; F21V 9/00
[52] U.S. Cl. .......................... 359/584; 359/359; 359/586; 359/588; 359/589; 362/293; 362/343; 372/43
[58] Field of Search .................... 359/359, 584, 359/586, 588, 589, 590; 362/293, 343; 252/587; 372/43

[56] References Cited

U.S. PATENT DOCUMENTS

| | | | |
|---|---|---|---|
| 4,649,462 | 3/1987 | Dobrowolski et al. | 362/293 |
| 5,169,229 | 12/1992 | Hoppert et al. | 359/589 |
| 5,646,780 | 7/1997 | Crook et al. | 359/584 |
| 5,687,185 | 11/1997 | Kozlovsky et al. | 372/43 |

*Primary Examiner*—Cassandra Spyrou
*Assistant Examiner*—Audrey Chang
*Attorney, Agent, or Firm*—Malcolm B. Wittenberg

[57] ABSTRACT

An optical interference coating on a refractory substrate, the coating being comprised of alternating layers of silicon dioxide and zirconium dioxide. The coating can be in the form of an optical filter where a substrate bearing the coating can be repeatedly cycled between room temperature and a temperature of at least 1000 ° C without significant degradation of its optical or mechanical properties.

20 Claims, 7 Drawing Sheets

| LAYER | MATERIAL | QWOT | THICKNESS (nm) |
|---|---|---|---|
| 1 | silica | 0.1058 | 10.00 |
| 2 | zirconia | 0.1925 | 12.20 |
| 3 | silica | 0.3809 | 36.00 |
| 4 | zirconia | 1.9627 | 124.40 |
| 5 | silica | 0.6053. | 57.20 |
| 6 | zirconia | 0.1925 | 12.20 |
| 7 | silica | 0.7016 | 66.30 |
| 8 | zirconia | 1.8065 | 114.50 |
| 9 | silica | 1.7312 | 163.60 |
| 10 | zirconia | 0.5711 | 36.20 |
| 11 | silica | 0.1058 | 10.00 |
| 12 | zirconia | 0.7857 | 49.80 |
| 13 | silica | 0.8264 | 78.10 |

| LAYER | MATERIAL | QWOT | THICKNESS (nm) |
|---|---|---|---|
| 1 | silica | 0.1058 | 10.00 |
| 2 | zirconia | 0.1925 | 12.20 |
| 3 | silica | 0.3809 | 36.00 |
| 4 | zirconia | 1.9627 | 124.40 |
| 5 | silica | 0.6053. | 57.20 |
| 6 | zirconia | 0.1925 | 12.20 |
| 7 | silica | 0.7016 | 66.30 |
| 8 | zirconia | 1.8065 | 114.50 |
| 9 | silica | 1.7312 | 163.60 |
| 10 | zirconia | 0.5711 | 36.20 |
| 11 | silica | 0.1058 | 10.00 |
| 12 | zirconia | 0.7857 | 49.80 |
| 13 | silica | 0.8264 | 78.10 |

OPTICAL INTERFERENCE COATING CAPABLE OF WITHSTANDING SEVERE TEMPERATURE ENVIRONMENTS

TECHNICAL FIELD OF THE INVENTION

This invention relates to the field of optical interference filters which are designed to operate at high temperatures, for example, coatings that are applied to the inner or outer surface of the envelope of a lamp burner. Such coatings include so called "hot mirrors" which reflect infrared radiation and transmit visible light as well as "cold mirrors" which reflect visible light while transmitting infrared radiation. A coating must withstand the high operating temperature of the surface of the lamp on which it is deposited, which oftentimes exceeds 900° C. in some applications.

BACKGROUND OF THE INVENTION

Use of a hot mirror to improve the efficiency of a lamp is well known, See, for example U. S. Pat. No. 4,229,066, by Rancourt et al. which discloses a design for such a hot mirror coating. In U.S. Pat. No. 4,663,557 Martin and Rancourt teach the use of a coating comprised of alternating layers of two materials, $SiO_2$ as a low index material, and $Ta_2O_5$ as a high index material to achieve a coating suitable for operation at temperatures in excess of 500° C. Their coating was fabricated by a technique known as e-beam evaporation. The maximum operating temperature of their coating in air is not clear from their specification; however, as is indicated by Kuus in the patent cited below, recrystallization of $Ta_2O_5$ occurs above 800° C., causing grains to form in the coating. The grains remain in the coating after exposure to high temperature, causing undesirable light scattering in subsequent operation. Martin and Rancourt state that their coating changes so as to become scattering to visible light when baked in air at 1100° C. for a number of hours.

In U. S. Pat. No. 4,734,614, Kuus discloses a lamp design in which the lamp envelope has a heat resistant interference coating on its inner or on its outer surface. The coating is comprised of alternating layers of $Nb_2O_5$ and $SiO_2$. Kuus claims that his coating is superior to the $Ta_2O_5/SiO_2$ layers of the prior art such as are specified in the Martin and Rancourt patent, the superiority being due to their greater stability at temperatures of 800° C. or more. He points out that near 800° C. $Ta_2O_5$ crystallizes to form $\beta$-$Ta_2O_5$, causing undesirable scattering of light by the coating. Other disadvantages cited by Kuus are a tendency of the coating with $Ta_2O_5$ to crack during operation of a lamp to which it has been applied and loss of transmission of the coating known as graying which may occur, especially under conditions where little oxygen is present. That the niobia/silica combination is not suitable for coatings which must operate a temperatures of 1000° C has been demonstrated in tests performed by us in which $Nb_2O_5/SiO_2$ optical interference coatings were baked at 1000° C. for an hour or more. After baking the coatings displayed excessive scattering of visible light appearing milky white under visual inspection.

U. S. Pat. 4,949,005 by Parham et al, pertains to the fabrication of interference coatings consisting of more than 12 alternating layers of $Ta_2O_5$ and $SiO_2$ by processes known to the art as chemical vapor deposition (CVD) or low pressure chemical vapor deposition (LPCVD). These processes allow uniform coatings to be deposited on substrates that are non planar, such as either the inner or outer surfaces of a cylindrical lamp burner envelope. The term "lamp burner" is taken to mean that part of the lamp within which light is generated. The Parham patent teaches the use of a prescribed heat treating process which causes the deposited film to crack in such a manner as to relieve the stress in the film while maintaining acceptable adhesion and spectral performance. After heat treatment, coated parts function without degradation after repeated cycling between room temperature and 900° C.

High temperature coatings which are fabricated by sputtering materials previously cited are also known to the art. Such coatings can be cycled between room temperature and 900° C without degradation, and are suitable for use on the outside of tungsten halogen lamps.

The prior art coatings such as those heretofore discussed can function at or below temperatures (800° to 900° C.) that are normally reached on the outside of a halogen lamp envelope during operation. At higher temperatures, these coatings develop excessive scatter and suffer degradation of their optical properties. In some applications coatings may be required to function at higher temperatures. For example, the temperature on the outer surface of a mercury discharge lamp burner may reach a temperature in excess of 1000° C. It is often desirable to provide an interference filter on this outer surface for the purpose of selectively reflecting or transmitting portions of the electromagnetic spectrum. The coating may have the function of selectively directing the light from the burner to some region of space outside the lamp, or of reflecting a portion of the spectrum (for example, infrared energy) back into the lamp while transmitting another portion, or a combination of these functions.

It is therefore an object of this invention to provide an interference coating which is not degraded by repeated cycles between room temperature and a second temperature, said second temperature being in excess of 1000° C. and as high as 1200° C., said coating being able to function before and after cycling as described in the paragraph above.

It is a further objective of this invention to provide an alternative coating to those coatings already available to the prior art, said alternative coating functioning as a hot mirror, cold mirror, or other type of coating that can be successfully employed on the outer surface of a device such as a halogen lamp, where this outer surface reaches a temperature in excess of 500°C. and as high as 1200° C.

SUMMARY OF THE INVENTION

The present invention consists of a coating applied to a substrate such as fused quartz, crystalline quartz, aluminum oxide or sapphire, the coating being comprised of alternating layers of zirconia ($ZrO_2$) and silica ($SiO_2$) to form respectively the high index and low index layers of an optical interference coating, wherein an additional thick layer of silica is disposed on top of the coating between the coating and the surrounding medium. The coating exhibits exceptional optical and mechanical stability during and after thermal cycling between room temperature and temperatures as high as 1200° C.

DESCRIPTION OF THE FIGURES

FIG. 7b is a section through the display tube of FIG. 7a.

DETAILED DESCRIPTION OF THE INVENTION

Figure 1:
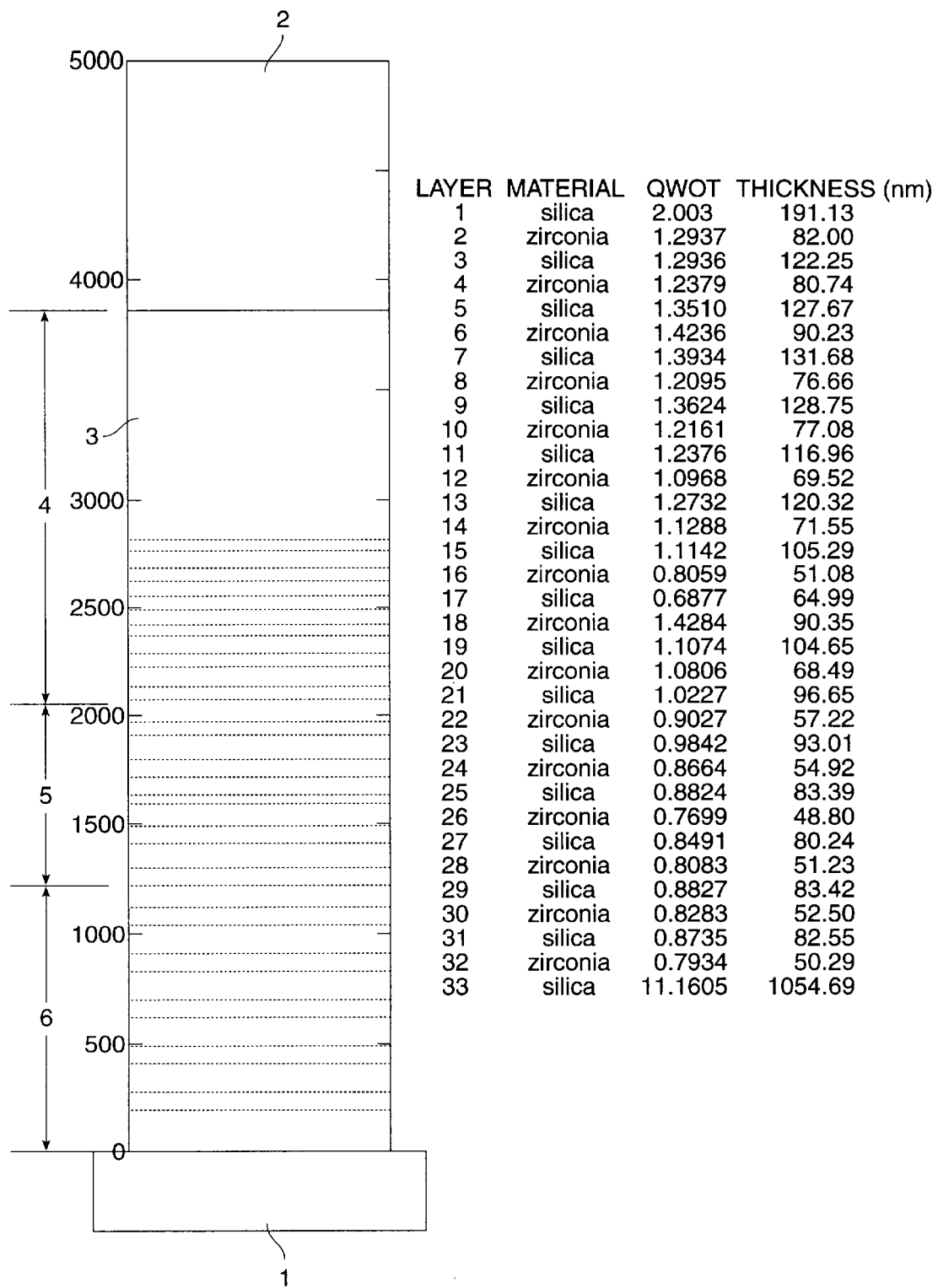
FIG. 1 is a diagram showing the layers of a cold mirror design according to the practice of the present invention which design is suitable for application to the burner of a high temperature discharge lamp.

The invention comprises an interference coating consisting of zirconia as a high index material and silica as a low index material which coating is capable of withstanding high temperatures. Mechanical stability of the coating over its operating temperature range is provided by the addition of a thick layer of $SiO_2$ on the side of the coating adjacent the surrounding medium. It has been discovered that in contrast to prior art coatings, the coatings of this invention may be subjected to thermal soak at temperatures well in excess of 900° C. for extended periods of time typical of the lifetime of a lamp without suffering increased scatter or loss of desirable optical properties. Furthermore, the coatings of this invention may be thermally cycled between room temperature and temperatures well in excess of 900° C. without mechanical failure or degradation of optical properties.

The discovery of the present invention was a result of tests carried out on coating systems which had the potential to operate at high temperature. It was found that coatings comprised of alternating layers of zirconia and silica could withstand thermal soak at temperatures in excess of 1000° C. for long periods of time without developing scatter. This is in contrast to prior art niobia/silica coatings which became milky white after the same thermal soak. While the coatings comprised of zirconia and silica were free of scattering after heat soak, they tended to fail mechanically when cooled to room temperature after the soak. The failure was more likely to occur as coating thickness increased. Inspection of failed parts showed that pieces of the substrate had broken away from the bulk, leaving the bond between the coating and the separated piece of the substrate intact. It was found that it was possible to prevent the mechanical failure by introducing an additional thick layer of silica on the surface opposite the substrate at the outer surface of the coating.

The beneficial effect of the layers may be understood by considering a series of alternating zirconia/silica layers that are deposited on a substrate at a temperature $T_{sp}$, which in a typical sputtering process might be in the vicinity of 200° C. After sputtering, when the substrate cools to room temperature, the zirconia layers, which have a higher temperature coefficient of expansion than the silica layers will go into tension, while the silicon layers will go into compression. The overall coating would decrease in size with respect to the underlying substrate if it were not attached to the substrate, since the silica within the coating is under compression, while the silica in the substrate is not. The coating, which is bonded to the substrate goes into tension, creating a stress at the coating/substrate boundary. Coatings formed by sputtering have been found to adhere to the substrate after removal from the machine, indicating that the stress created by cooling from $T_{sp}$ to room temperature is insufficient to cause mechanical failure. Now consider the effect of raising the coated substrate to a high temperature. As the temperature of the part exceeds the sputtering temperature, the stress in the silica layers and the substrate changes from compression to tension. The tensile stress continues to increase until at a temperature, $T_d$, which is higher that $T_{sp}$, the zirconia layers undergo a densification, causing these layers to relax so that the stress in the coating drops to nearly zero at this temperature. When the part is returned to room temperature the stress returns to zero as the temperature reaches $T_d$, and as cooling continues, stress buildup again begins, the stress in the silica layers becoming compressive and the stress in the zirconia layers becoming tensive. As the temperature approaches room temperature, the stress which has been building up as the temperature decreased from $T_d$ to room temperature, rather than from the lower temperature $T_{sp}$ to room temperature as before, is sufficient to cause mechanical failure.

The present invention provides a thick stress balancing layer on the outside of the film. This layer is comprised of silica and its thickness depends on the total thickness of the coating. For a coating consisting of a few layers, such as the anti-reflection coating to be discussed subsequently in connection with FIG. 6, it may not be necessary to provide this layer. For thicker coatings, such as that described in FIG. 1, it is preferred that the total thickness of the stress balancing layer exceed half of the total thickness of the other silica layers in the coating. In practice, the layer goes into compression as the substrate cools, relieving the tensile stress in the outermost zirconia layer. The stress on the interface between the substrate and the coating is also reduced by the outer layer, since the outer layer carries some of the stress that would be borne by the interface if the outer layer were not present. Furthermore, the outer layer, by bonding to the outer surface of the interference coating, reinforces the outer surface so that localized areas of high stress caused by surface irregularities do not develop into cracks that can propagate through the coating and enter the substrate.

In the practice of the present invention the layer of the interference coating nearest the substrate is preferably comprised of silica. This layer forms a buffer between the substrate and the coating so as to provide better adhesion between the lowest layer of the deposited coating and the substrate, than would result if the lowest layer were comprised of zirconia.

FIG. 1 shows an embodiment of the present invention applied to the design and fabrication of a coating known to the art as a broad band cold mirror. The coating reflects visible light while transmitting radiation in the near infrared region of the spectrum. On the left side of the figure a section through the coating made by a plane perpendicular to the substrate is shown. The substrate 1 is shown at the bottom of the figure and the surrounding medium 2 fills the region at the top of the figure. The thick upper layer 3 is the stress balancing layer. The arrangement of the inner layers of the coating is based on principles which are well known to the art. Three reflecting stacks disposed between the boundaries 4, 5, and 6 have the form of a(HL)ñ, where H, stands for the high index material, zirconia, L stands for the low index material, silica, n is the number of layer pairs in the stack, and a gives the quarter wave optical thickness of each of the layers in terms of a reference wavelength. Each stack is designed to reflect light in one of three contiguous broad bands of the visible spectrum so that the overall coating reflects a large proportion of light that falls within the visible spectrum. The design was optimized by a commercially available software program known as TFCALC™ which slightly modified each layer thickness initially specified by a(HL)ñ to give the optimized design in the figure.

The table in FIG. 1 shows the details of the design. The first column gives the number of the layer counting from the innermost layer, the second column shows the quarter wave optical thickness (QWOT) of each layer, and the third column gives the actual thickness in nm. Layers groups 1–11, 12–21 and 22–33 comprise the three stacks. The stress balancing layer is layer number 33. The thickness of the stress balancing layer is 1054 nm, the total coating thickness is 3858 nm, and the total thickness of the silica layers, excluding the stress balancing layer, is 1730 nm. The thickness of the stress balancing layer was determined by applying the previously-mentioned principle that its preferred thickness should exceed half the total thickness of the other silica layers (865 nm). Initially, a thickness of 1000 nm, which meets the criterion, was selected. This was adjusted to the thickness shown in the table (1066 nm) as the thickness of the layer was optimized to make it a functional part of the stack indicated by the reference numeral 4.

Figure 2:
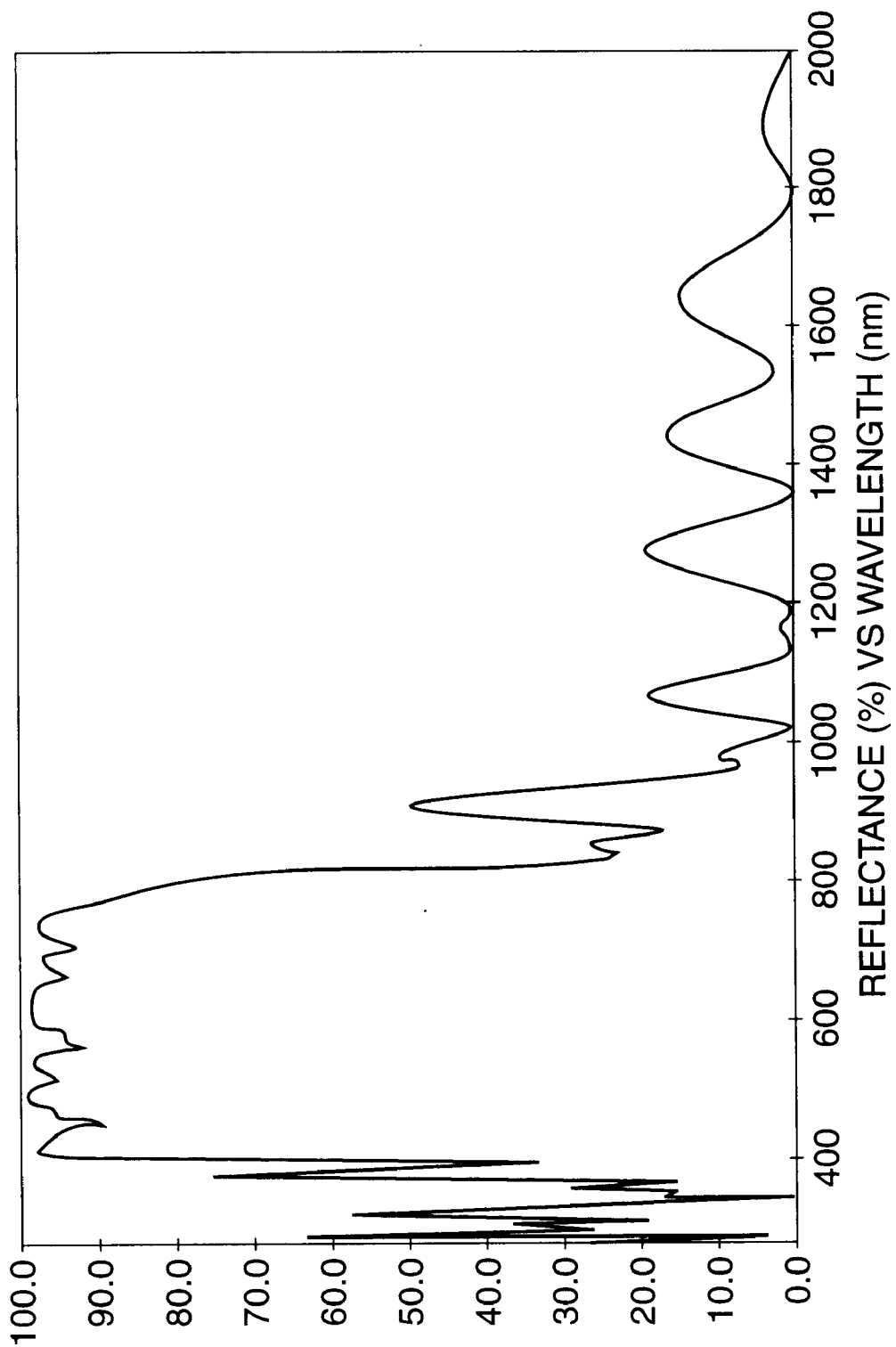
FIG. 2 is a graph showing the calculated spectral performance of the design of FIG. 1.

FIG. 2 is a plot of the calculated reflectivity of the stack design shown in FIG. 1 as a function of the wavelength of unpolarized light striking the at normal incidence. The design exhibits an average reflectivity exceeding 95% over the band of visible wavelengths and the 90% transmission points are at 414 and 795 nm.

Figure 3A:
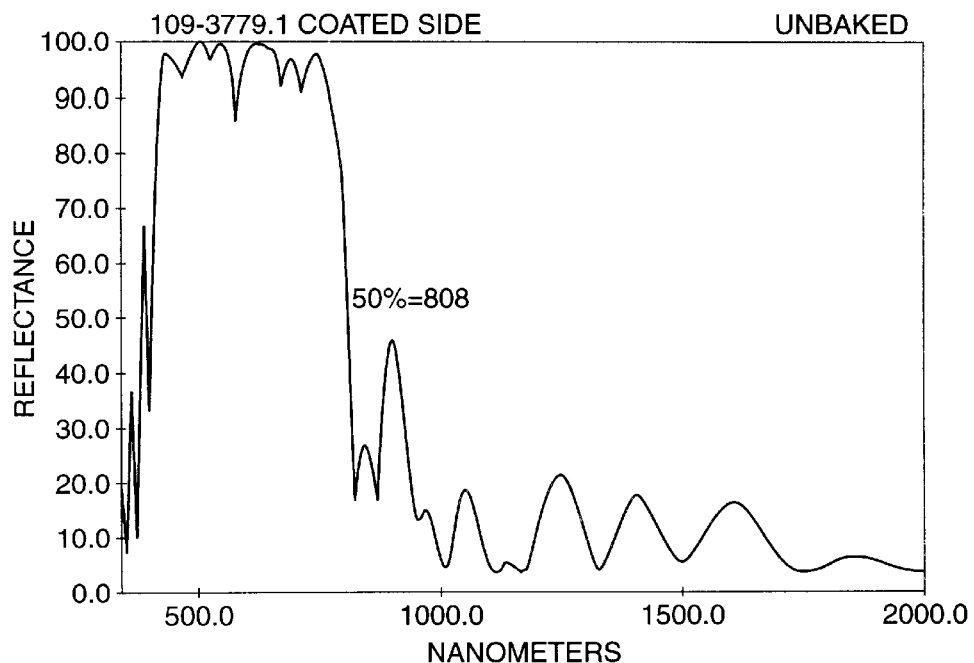
FIG. 3a is a spectral scan of a fused quartz witness sample with a coating fabricated according to the design of FIG.1 after removal from its coating machine.
Figure 3B:
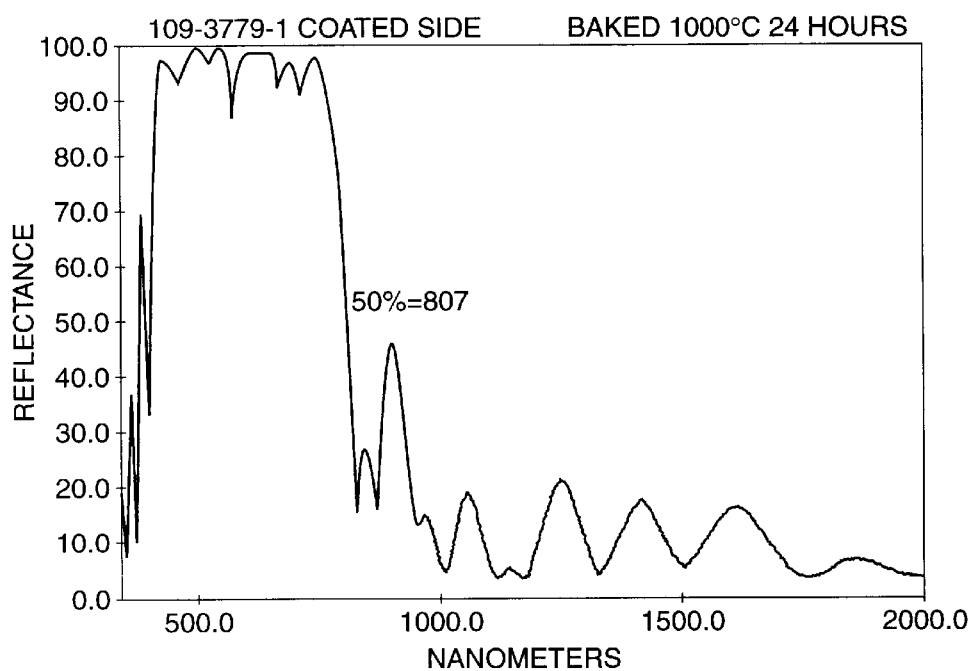
FIG. 3b is a spectral scan of the part of FIG. 3a after bake at 1000° C. for 24 hours.

The embodiment of FIG. 1 was coated on quartz substrates and the resulting coated parts were spectrally scanned. They were then divided into two groups, the first group being subsequently baked at 1000° C. for 24 hours, and the second group being baked at 1200° C. for the same time. FIG. 3a shows the measured reflectivity as a function of wavelength of one of the parts from the first group before bake while FIG. 3b shows the results of the same measurements on the same part after bake. Comparison of the two figures shows that the 1000° C. bake had virtually no effect on the spectral performance of the coatings.

Figure 4A:
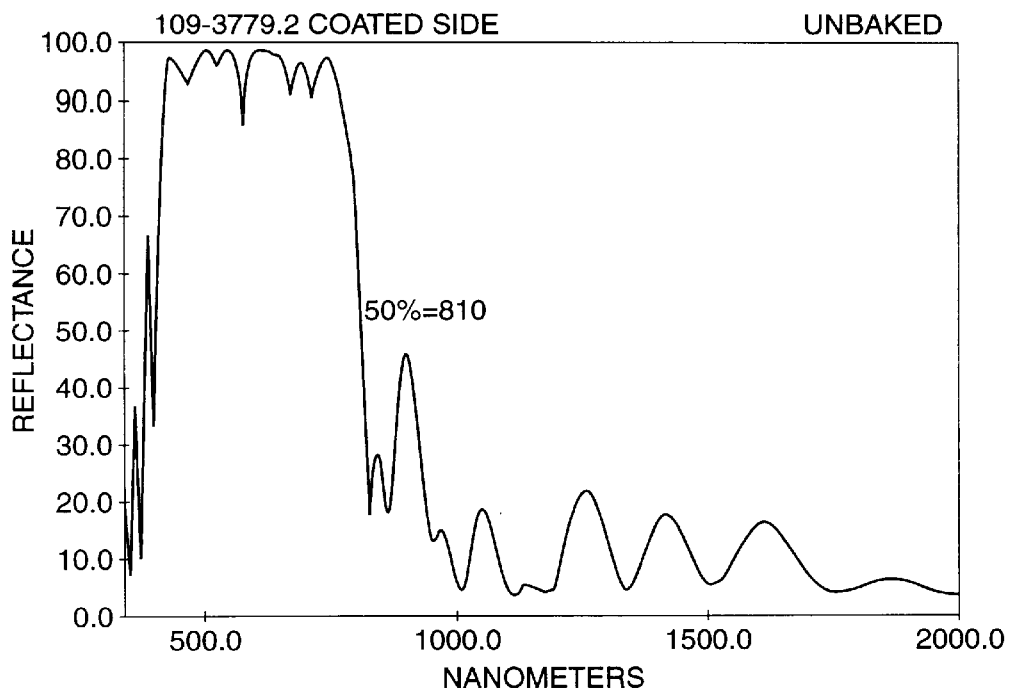
FIG. 4a is a spectral scan of a different witness sample fabricated according to the design of FIG. 1 after removal from its coating machine.
Figure 4B:
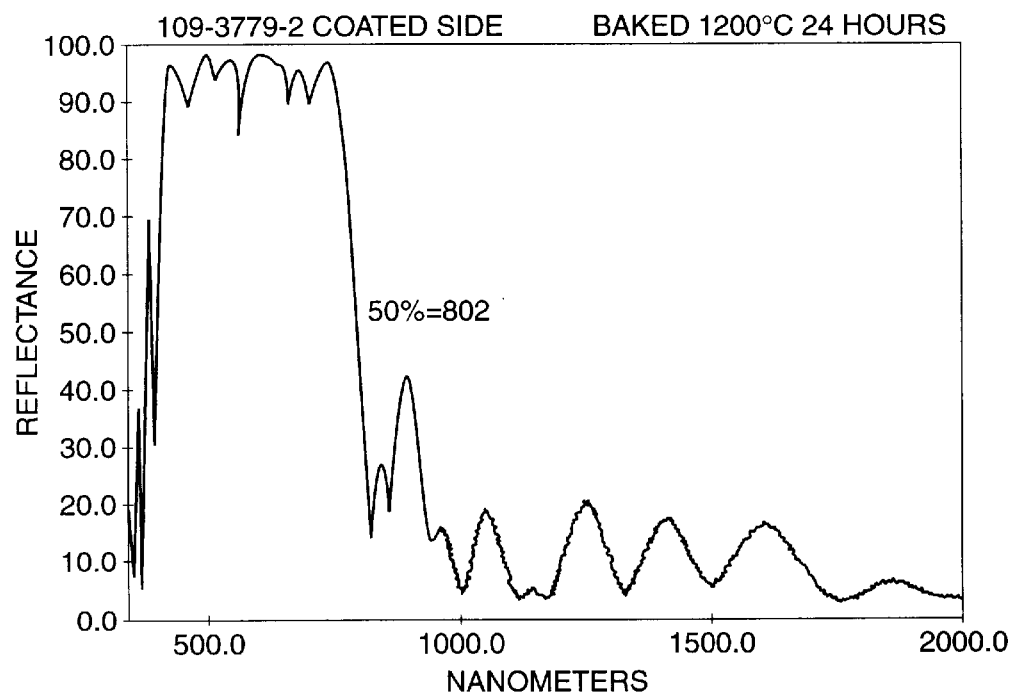
FIG. 4b is a spectral scan of the part of FIG. 4a after bake at 1200° C. for 24 hours.

FIGS. 4a and 4b show spectral scans for parts from a second group of coated quartz substrates before and after bake. The baked sample was reduced in spectral reflectivity integrated over the visual portion of the spectrum by about 2% compared to the unbaked sample.

Under visual inspection the coatings whose spectral performance is shown in FIGS. 3a, 3b, 4a and 4b looked clear and defect free. Under microscopic examination they showed little evidence of cracking. The results shown in FIGS. 3 and 4 indicate that application of temperatures as high as 1200° C. produces insignificant degradation in either the spectral properties of the coating or in its mechanical durability. In other similar tests cylindrical parts having the form of lamp burners that had been given the coating of FIG. 1 were baked for periods 430 hours at temperatures of 1000° C., 1100° C., and 1200° C, returned to room temperature and then tested. Spectral analyses showed insignificant change after bake at 1000° C., 1100° C. and 1200° C. The 1200° C. bake resulted in a small loss (4.6%) in the reflectivity integrated over the visual spectral range. Furthermore, the parts passed tape tests after bake, indicating that they were mechanically durable. These results demonstrate that the coatings of this invention shown in FIG. 1 can operate on the surface of a mercury discharge lamp whose surface may reach a temperature up to 1200° C. while maintaining its spectral and mechanical properties.

Figure 5A:
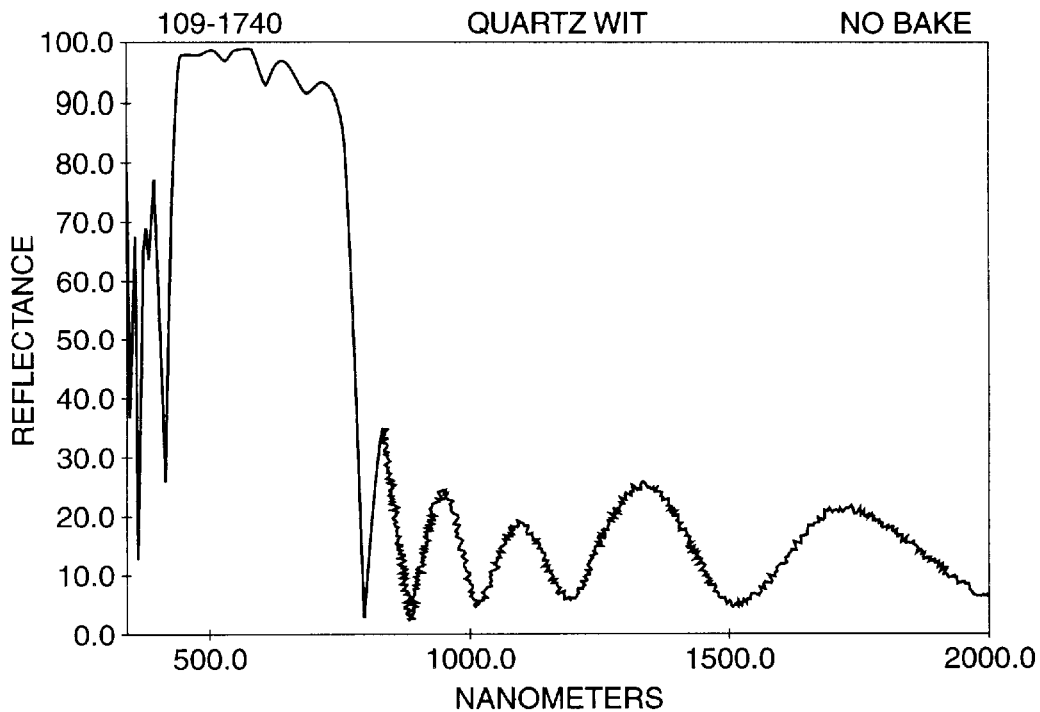
FIG. 5a is a spectral scan of a prior art fused quartz witness sample which had been given a cold mirror coating according to prior art.
Figure 5B:
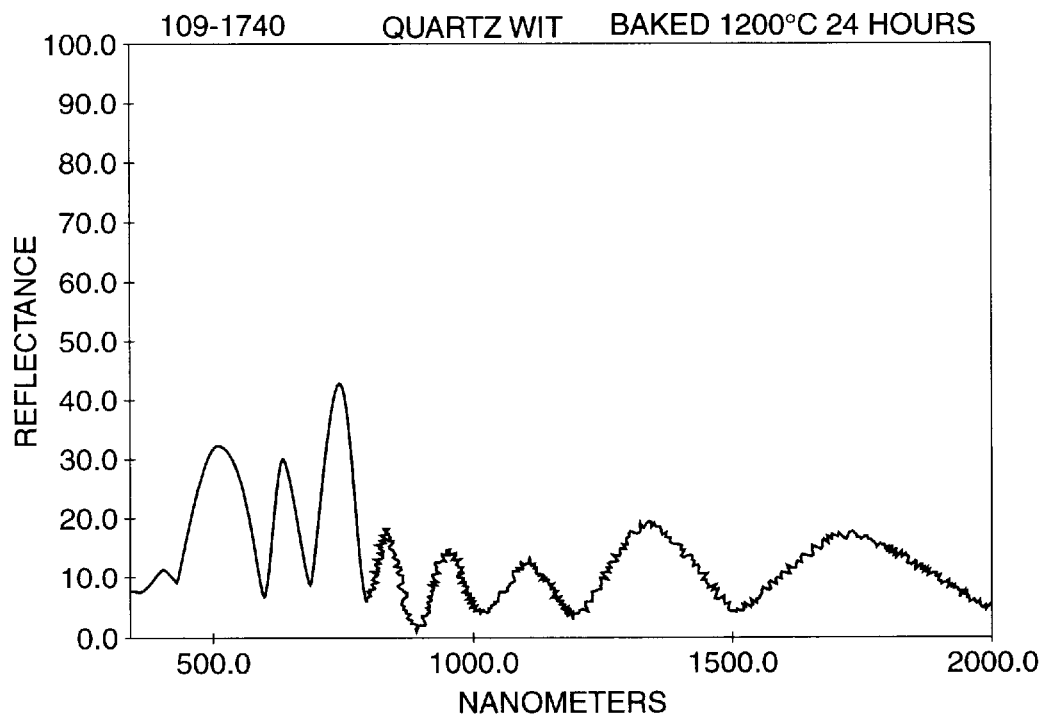
FIG. 5b is a spectral scan of the prior art witness sample of FIG. 5a after bake at 1000° C. for 12 hours.

In contrast to the coatings of the present invention, prior art coatings in which niobia and silica were used as alternating layers were severely degraded by a twelve hour bake at 1000° C. FIG. 5a is a spectral reflectance scan of such a prior art coating comprised of niobia and silica layers arranged to produce a cold mirror having similar spectral properties to those of the coating of FIGS. 3a and 3b. The similarity is confirmed by comparing FIGS. 3a and 5a. FIG. 5b is a spectral reflectance scan of the same part after it had been baked for 12 hours at 1000° C. By reference to FIG. 5b one determines that the reflection of the coating in the visible band has been reduced from approximately 95% before bake to about 20% after bake, indicating that the bake had rendered the coating unusable. Under visual inspection the part was transparent with a blue coloration prior to baking. After baking, the part appeared to be opaque and was milky white in appearance.

The coating of FIG. 1 is a particular embodiment of the invention in which it has been applied to the design and fabrication of a cold mirror. Other embodiments consist of the application of the invention to the design and fabrication of different types of coatings such as hot mirror coatings, coatings designed to transmit or reflect particular colors, coatings for ultra-violet transmission or rejection filters, or coatings for some other purpose. The utility of the embodiments is based on the ability of their zirconia/silica layers to withstand temperatures up to 1200° C. without loss of their optical properties. For thick coatings, mechanical stability of the substrate and coating is provided by the previously mentioned silica stress balancing layer on the outside of the interference coating. Embodiments of the coating may be applied to one or both surfaces of a substrate which is operated at a temperature as high as 1200° C., such as a lamp burner for a halogen lamp, for a vapor discharge lamp or for an arc lamp.

Figure 6:
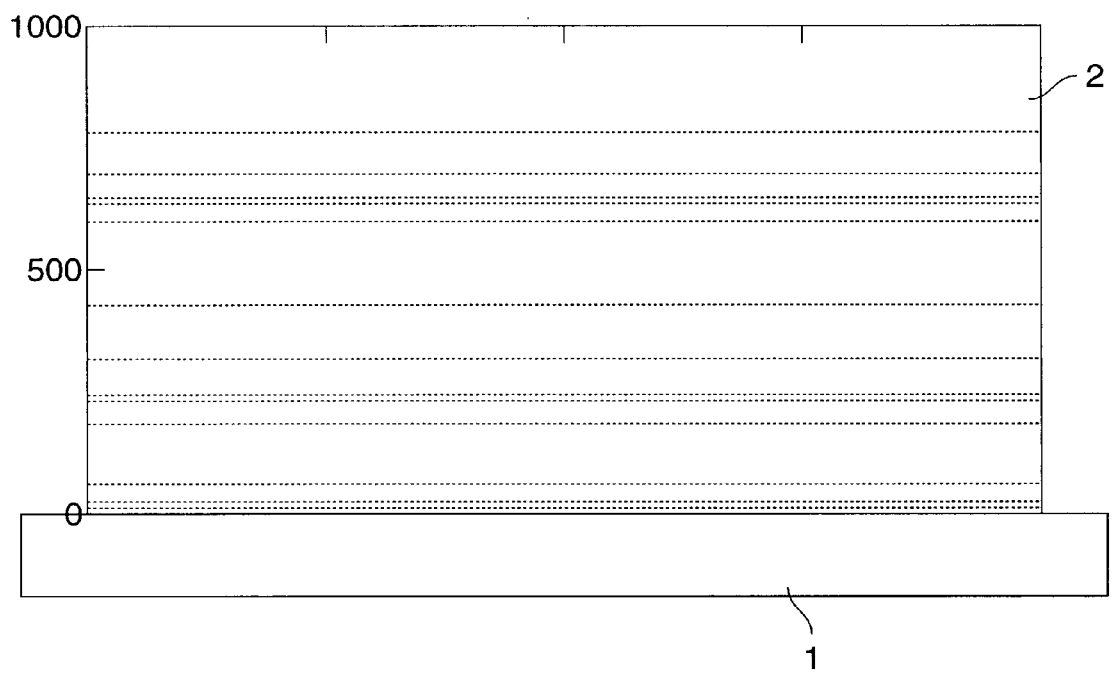
FIG. 6 is an embodiment of the present invention in the form of a list of suitable layers and a cross section of a broad band A/R coating of those layers which could be applied to the face plate of a display tube.

FIG. 6 shows an embodiment of the invention which is a broad band anti-reflection coating for use in the visible band. The design reflects less that 0.5% of normally incident unpolarized light between 370 and 710 nm wavelength. This embodiment could form the anti-reflection coating for the outer surface of a display tube face plate that will be discussed subsequently. The ability of the coating to withstand high temperatures is not required in the operation of the display tube, but it provides a significant advantage in the manufacture of the tube.

Like FIG. 1, FIG. 6 contains a cross sectional view of the layers of the coating with the substrate 21 on the bottom and the surrounding medium 22 on top. At the top of the figure is a table like that of FIG. 1 showing the QWOT and the thickness in nm of each of the layers in the design, the layers being numbered from the bottom up. The total thickness of the coating is 770.5 nm and the total thickness of the silica layers without the top layer is 342.1 nm. Applying the principle that the upper silica layer preferably is at least as thick as approximately half the total thickness of the other silica layers, the preferred thickness of the upper layer should be greater that 171 nm. In the case of this relatively thin anti-reflection coating, an outer layer having a thickness of 78.1 nm, as determined by the design software from spectral considerations alone, was used. This coating exhibited spectral and mechanical stability under thermal cycling, indicating that for thin coatings having a total silica thickness of less than approximately 500 nm, it is not always necessary that the outer silica layer exceed the preferred thickness.

The coating of FIG. 6 may be envisioned for use on surfaces which operate at low temperature, but which are subjected to high temperature during manufacturing steps that take place after the coating is applied. For example, the viewing surface of a display tube, such as a computer monitor is normally fabricated separately from the remainder of the tube envelope and then attached by a process known as "fritting". During the fritting process, portions of the viewing surface are heated to temperatures exceeding 1000° C. A coating fabricated according to the present invention withstands temperatures encountered during fritting; therefore, the coating may be applied before the attachment of the face plate to the envelope. Thus the coating of the present invention may be applied to a smaller part than prior art coatings, permitting a greater rate of assembled part production by a manufacturing process that utilizes a coating machine of a given size.

Figure 7A:
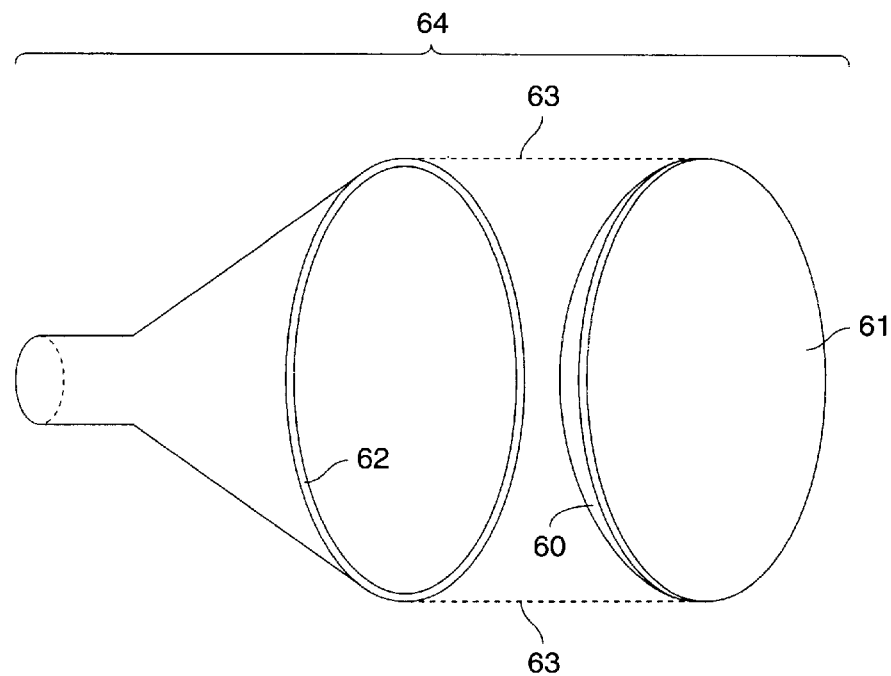
FIG. 7a is an exploded perspective view of a display tube in which the faceplate has an anti-reflection coating according to the present invention showing heat being applied during the process of fritting.

FIG. 7 shows how the manufacture of the device is facilitated by the use of a coating of the present invention. FIG. 7a shows the faceplate 60 of a display tube with the anti-reflection coating 61 on its viewing surface. The rear part 62 of the display tube envelope is shown in a position to be mated to the faceplate by translation along the dotted lines. Before assembly the coating on the faceplate will have been annealed, so that it will be able to withstand the high temperatures which occur during the assembly process. When the parts are mated, they form the tube envelope 64.

Figure 7B:
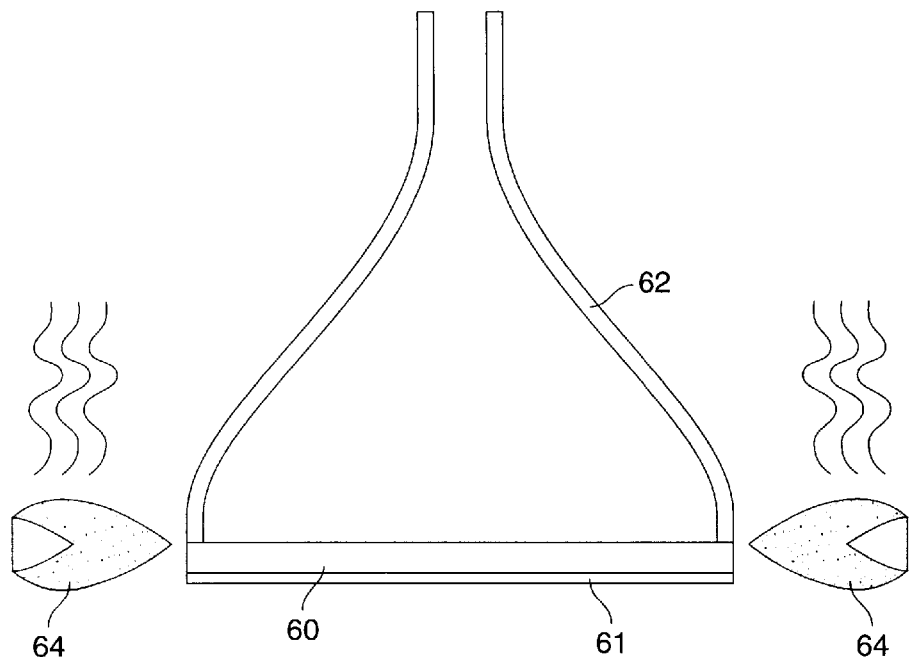

FIG. 7b shows the fritting process taking place. The faceplate and the rear portion of the tube envelope are in close proximity, and a thin layer of frit material, not shown., fills the joint between them. Heat is applied circumferentially to the joint by the heating means 65 until the frit melts and a vacuum tight seal between the faceplate and rear portion is formed by the molten frit material. During this process the temperature of the faceplate may be in excess of 900° C., requiring that the anti-reflection coating be able to withstand this temperature.

Had the faceplate been coated with a prior art coating whose performance would be degraded by the temperatures encountered during fritting, it would have been necessary to assemble the tube envelope before coating the viewing surface of the tube. This would have required that the entire envelope of the tube be placed within the coating machine. Because of the much larger size of the envelope compared to the faceplate, a smaller number of parts could have been coated in each batch passing through the machine. Therefore, use of an anti-reflection coating according to the present invention reduces the cost of manufacturing the coated envelopes.

We claim:

1. An optical interference coating for application to a surface, said coating being capable of repeated cycling between room temperature and approximately 1200° C. without significant mechanical degradation, said coating comprising alternating layers of zirconia and silica; and, a layer for completing said coating located most remotely from said surface, said layer including silica of a thickness at least half the thickness of the sum of all other layers of silica applied to said surface.

2. A composite substrate and coating, said substrate comprising a member selected from the group consisting of: fused quartz, crystalline quartz, aluminum oxide and sapphire, said coating comprising a first layer of silica in contact with said substrate, a series of alternating layers of zirconia and silica, and a final layer of silica having a thickness of at least approximately half the thickness of the sum of all other silica layers within said coating.

3. A multi-layered optical interference coating structure for a substrate surface comprising:

(a) a buffer layer covering at least a portion of said substrate surface, said buffer layer containing a silica material;

(b) a balance layer disposed over said buffer layer, said balance layer containing a silica material; and, (c) a stacked plurality of intermediate layers disposed between said buffer and balance layers, at least one of said intermediate layers containing a silica material, at least one of said intermediate layers containing a zirconia material;

said balance layer is characterized by a predetermined thickness dimension equaling at least approximately half the cumulative thickness dimension of said buffer layer and all said intermediate layers containing a silica material;

whereby said optical interference coating is adapted to withstand thermal exposure at ambient temperatures ranging to approximately 1200° C. without undergoing substantial optical alteration.

4. The optical interference coating as recited in claim 3 wherein each of said layers containing a silica material forms a low index layer, and each of said layers containing said zirconia material forms a high index layer.

5. The optical interference coating as recited in claim 3 wherein said optical interference coating is adapted for coating a substrate selected from the group consisting of: fused quartz, crystalline quartz, aluminum oxide, and sapphire.

6. The optical interference coating as recited in claim 5 wherein said optical interference coating is adapted for coating said substrate to form an enclosure for a burner of a high temperature discharge lamp.

7. The optical interference coating as recited in claim 5 wherein said optical interference coating is adapted for coating said substrate to form an enclosure for a filament of a high temperature incandescent lamp.

8. The optical interference coating as recited in claim 3 wherein said optical interference coating layers are operably configured to form on said substrate a broad band cold mirror.

9. The optical interference coating as recited in claim 3 wherein said optical interference coating layers are operably configured to form on said substrate a hot mirror.

10. The optical interference coating as recited in claim 3 wherein said optical interference coating is adapted for coating said substrate to form an enclosure for a lamp selected from the group consisting of: a halogen lamp, a vapor discharge lamp, and an arc lamp.

11. The optical interference coating as recited in claim 3 wherein said optical interference coating is adapted for coating a substrate to form a surface of a display tube.

12. An optical device having a predefined set of characteristic optical properties, said optical device comprising:

(a) a substrate having an outer surface;

(b) a buffer layer formed on said substrate outer surface, said buffer layer containing a silica material;

(c) a stacked plurality of intermediate layers formed over said buffer layer, at least one of said intermediate layers containing a silica material, at least one of said intermediate layers containing a zirconia material; and, (d) a balance layer formed over said stacked intermediate layers for reinforcement of said optical device against thermally-induced mechanical failure, said balance layer containing a silica material;

said balance layer is characterized by a predetermined thickness dimension equaling at least approximately half the cumulative thickness dimension of said buffer layer and all said intermediate layers containing a silica material;

whereby said optical device is adapted to withstand ambient temperatures within the approximate range between room temperature and 1200° C. without substantial alteration in said characteristic optical properties thereof.

13. The optical device as recited in claim 12 wherein each of said layers containing a silica material forms a low index layer and each of said layers containing said zirconia material forms a high index layer.

14. The optical device as recited in claim 12 wherein said substrate includes a material selected from the group consisting of: fused quartz, crystalline quartz, aluminum oxide, and sapphire.

15. The optical device as recited in claim 14 wherein said optical device forms an enclosure for a burner of a high temperature discharge lamp.

16. The optical device as recited in claim 14 wherein said optical device forms an enclosure for a filament of a high temperature incandescent lamp.

17. The optical device as recited in claim 12 wherein said optical device forms a broad band cold mirror.

18. The optical device as recited in claim 12 wherein said optical device forms a hot mirror.

19. The optical device as recited in claim 12 wherein said optical device forms an enclosure for a lamp selected from the group consisting of: a halogen lamp, a vapor discharge lamp, and an arc lamp.

20. The optical device as recited in claim 12 wherein said optical device forms a faceplate of a display tube.

* * * * *